United States Patent
Hattori et al.

(10) Patent No.: US 6,294,665 B1
(45) Date of Patent: Sep. 25, 2001

(54) PROCESS FOR PRODUCING WATER-SOLUBLE POLYSACCHARIDE

(75) Inventors: Mitsuo Hattori; Shushi Nagaoka; Hirokazu Maeda, all of Izumisano (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 09/318,010

(22) Filed: May 25, 1999

(30) Foreign Application Priority Data

Jun. 11, 1998 (JP) .................................................. 10-163237
Apr. 30, 1999 (JP) .................................................. 11-123366

(51) Int. Cl.$^7$ .............................. C07H 1/00; C08B 37/14; C08B 3/00
(52) U.S. Cl. .............................. 536/124; 536/56; 536/58; 536/63
(58) Field of Search ................................. 536/56, 58, 63, 536/124

(56) References Cited

U.S. PATENT DOCUMENTS

| | | | |
|---|---|---|---|
| 3,926,840 | * | 12/1975 | Wendler et al. ...................... 252/356 |
| 4,507,473 | * | 3/1985 | Bernert et al. .......................... 536/86 |
| 4,551,331 | * | 11/1985 | Rudin ................................. 424/195.1 |
| 4,769,081 | * | 9/1988 | Maher ..................................... 127/33 |
| 4,898,935 | * | 2/1990 | Nakamura et al. .................. 536/119 |
| 5,032,659 | * | 7/1991 | Heidel ................................. 527/300 |

FOREIGN PATENT DOCUMENTS

| | | |
|---|---|---|
| 61168956 | 7/1986 | (JP) . |
| 6197394 | 7/1994 | (JP) . |
| 8213593 | 8/1996 | (JP) . |

* cited by examiner

*Primary Examiner*—Gary Geist
*Assistant Examiner*—Everett White
(74) *Attorney, Agent, or Firm*—Paul & Paul

(57) ABSTRACT

A process for producing a granulated water-soluble polysaccharide, wherein the water-soluble polysaccharide in powder is sprayed with a binder solution, the process comprising using a mixed solution of a water-soluble polysaccharide and an emulsifier as a binder. The process produces a water-soluble polysaccharide excellent in handling behavior such as dissolution in water, suppression of foaming during dissolution and suppression of dusting during a handling operation.

10 Claims, No Drawings

PROCESS FOR PRODUCING WATER-SOLUBLE POLYSACCHARIDE

BACKGROUND OF THE INVENTION

1. Field of the Invention

The present invention relates to a process for producing a water-soluble polysaccharide, and more specifically, it relates to a process for producing a water-soluble polysaccharide excellent in its dissolution behavior, and in suppression of foaming and dusting during its dissolution.

2. Description of the Related Art

When a water-soluble polysaccharide is dissolved in or dispersed into water, it has had useful effects such as the so-called dispersion effect of improving the dispersibility of other substances, the so-called thickening effect of increasing the viscosity of the system and an emulsifying effect, and it has shown various useful functions and properties.

Many of the water-soluble polysaccharides are often in the form of dried powder products. When the powder products are added to water, they are hydrated more quickly, on their surface contacted with water, than they are dissolved therein while they are being dispersed thereinto. They have therefore the problem in that they produce so-called "undissolved powder lumps" which are difficult to dissolve. That is, since many of the water-soluble polysaccharides exhibit thickening behavior and are capable of lowering the surface tension, they have problems such as mentioned below. When they are added to water, to be dissolved therein, they tend to generate foam and, in extreme cases, the volume of the foams becomes larger than that of the aqueous solution, which requires enlargement of the dissolution installation. Moreover, when "undissolved powder lumps" exist in the foam thus generated, dissolution of the "undissolved powder lumps" is very difficult.

In order to efficiently dissolve such water-soluble polysaccharide powder which is difficult to dissolve in water, there are procedures such as a procedure in which stirring is conducted under reduced pressure, a procedure in which the water temperature is raised or the water is heated during dissolution, and a procedure in which a dissolver of a centrifugal defoaming type is used. However, any one of these procedures requires a corresponding facility. Accordingly, a water-soluble polysaccharide in a commercial form, in which the polysaccharide is readily dissolved in water, is desired.

Moreover, in order to suppress foaming during dissolution of the water-soluble polysaccharides in water, there has been a procedure of adding an antifoamer. However, the procedure requires repeated operations; therefore a water-soluble polysaccharide which foams less is desired.

Furthermore, since many of the water-soluble polysaccharides are in the form of dried fine powder, the polysaccharides tend to float in the air at the time of handling them, that is, so-called "dusting" tends to take place; in extreme cases there arises not only the danger of dust explosion but also a sanitary problem in that the operation environment is polluted.

In order to prevent such dusting of the water-soluble polysaccharides, there is a procedure in which the particle size is increased in the granulating step and a procedure in which the particle surfaces of the powder are processed. However, since the granulation and surface processing steps become costly, the steps are difficult to adopt as mere countermeasures for the powder floating.

As explained above, in order to make the water-soluble polysaccharides exhibit their functions and properties, it is essential to dissolve them in or disperse them into water. However, the water-soluble polysaccharides in powder form have the problem of dissolution in water as well as that of foaming during dissolution and dusting during the handling operation. Accordingly, they are not necessarily satisfactory at present from the aspect of handling.

SUMMARY OF THE INVENTION

It is an object of the present invention to provide a process for producing a water-soluble polysaccharide exhibiting excellent handling behavior such as excellent dissolution in water, suppressed foaming during dissolution and suppressed dusting during handling operation.

As a result of intensively investigating the problems as mentioned above, the present inventors have made the discovery that granulation of a water-soluble polysaccharide in powder using a mixed solution of a water-soluble polysaccharide and an emulsifier as a binder solution can produce a water-soluble polysaccharide excellent in handling behavior such as significantly improved dissolution in water of the granules, suppressed foaming during dissolution and suppressed dusting during handling operation. The present invention has been completed on the basis of this discovery.

That is, the present invention provides a process for producing a granulated water-soluble polysaccharide, comprising granulating a water-soluble polysaccharide in powder while a mixed solution of a water-soluble polysaccharide and an emulsifier is being used as a binder.

DESCRIPTION OF THE PREFERRED EMBODIMENTS

In the present invention, ordinarily, the water-soluble polysaccharide in powder which is to become the nuclei of the granules is fundamentally identical to the water-soluble polysaccharide to be used in the binder solution. However, both polysaccharides may differ from each other. Accordingly, the water-soluble polysaccharide in the present specification designates either one of the polysaccharide to become the nuclei of the granules and that to be used in the binder solution or both polysaccharides, unless otherwise noted.

Examples of the water-soluble polysaccharides include water-soluble hemicellulose, gum arabic, tragacanth gum, carrageenan, xanthan gum, guar gum, tara gum, gloiopeltis glue, agar, furcellaran, tamarind seed polysaccharide, kalaya gum, hibiscus, pectin, sodium alginate, pullulan, jellan gum, locust bean gum, various starches, carboxymethyl cellulose (CMC), methylcellulose (MC), ethylcellulose (EC), hydroxymethylcellulose (HMC), hydroxyethylcellulose (HEC), hydroxypropylcellulose (HPC), hydroxyethylmethylcellulose (HEMC), hydroxyethylethylcellulose (HEEC), hydroxypropylmethylcellulose (HPMC), hydroxypropylethylcellulose (HPEC), hydroxyethylhydoxypropylcellulose (HEHPC), sulfoethylcellulose, dihydroxypropylcellulose (DHPC), propylene glycol alginate and processed starches such as soluble starch.

Of the water-soluble polysaccharides mentioned above, water-soluble hemicellulose is preferred in the present invention, and plant-derived water-soluble hemicellulose is more preferred. The plant-derived water-soluble hemicellulose is preferred to be derived from beans, particularly from soybeans, more particularly from soybean cotyledon.

Although the water-soluble hemicellulose can be used regardless of its molecular weight, a preferred average molecular weight is from several tens of thousand to several millions, and a specifically preferred average molecular weight is from 50,000 to 1,000,000. In addition, the average molecular weight of water-soluble hemicellulose is a value obtained by the intrinsic viscosity method by which the viscosity thereof in a 0.1 M $NaNO_3$ solution is measured using standard pullulan (commercially available from Showa Denko K.K.) as a standard substance. Moreover, measurement of uronic acid was performed by the Blumenkrantz method, and measurement of neutral sugars was performed by the GLC after converting it into alditol acetate.

Water-soluble hemicellulose can be extracted with water from a raw material containing hemicellulose. In some cases, it is heat eluted under an acidic or alkaline condition, or it is decomposition eluted with an enzyme. One example of the process for producing water-soluble hemicellulose is as explained below.

The following plant materials can be used as raw materials for water-soluble hemicellulose: husks usually obtained by removing oil and fat and protein from oily seeds such as soybeans, palms, coconut, cone and cotton seed; and lees usually obtained by removing starch and the like from grains such as rice and wheat. When soybeans are the raw material, okara (bean-curd refuse) produced simultaneously during preparation of tofu (bean-curd), soybean milk or separated soybean protein can be utilized.

Such a raw material is heat decomposed preferably at temperatures of from 80 to 140° C., more preferably from 100 to 130° C. under an acidic or alkaline condition, preferably at a pH near the isoelectric point of each protein, and the water-soluble fraction is fractionated to give the extracted solution of the water-soluble hemicellulose. The extracted solution is preferably subjected to, for example, activated carbon treatment, resin absorption or ethanol precipitation, thereby removing hydrophobic or low molecular weight substances, purified, and sterilized. The treated solution of water-soluble hemicellulose having been subjected to such treatments is dried to give water-soluble hemicellulose in powder.

Although the water-soluble polysaccharide can be used singly in the present invention, it can also be used in combination with an existing synthetic water-soluble polymer, or a natural or semi-natural water-soluble polymer to change the properties of the water-soluble polysaccharide such as viscosity. The properties of the polymer are also changed. After all, the water-soluble polysaccharide and the polymer influence each other to alter their properties.

Examples of the existing synthetic water-soluble polymer include water-soluble acrylic resins, water-soluble styrene-acrylic resins, water-soluble styrene-maleic acid resins, and salt compositions of these resins. Moreover, the following water-dispersible resin emulsions can also be exemplified as the existing effective synthetic polymers: acrylic resins, alkyd resins, vinyl resins, polyester resins, styrene resins, maleic acid resins, urethane resins, and the like resins.

On the other hand, examples of the existing natural or semi-natural water-soluble polymer include water-soluble proteins (like albumin) such as gelatin, sodium caseinate and whey, in addition to the water-soluble polysaccharides mentioned above.

Existing emulsifiers can be used in the present invention. Examples of the emulsifiers usable in the present invention include nonionic surfactants such as sorbitan fatty acid esters, glycerol fatty acid esters, sugar esters and polyoxyalkylene alkylphenyl ethers, various anionic surfactants such as fatty acid soap, salts of alkylbenzenesulfonic acids and salts of sulfuric acid esters of higher alcohols, cationic surfactants such as quaternary ammonium salts and amphoteric surfactants such as lecithin.

Since an excessively high pour point of the emulsifier to be used markedly hinders its dissolution in water, the pour point is up to 50° C., preferably up to 30° C. Fatty acid esters including saturated fatty acids of up to 16 carbon atoms, preferably up to 12 carbon atoms, or unsaturated fatty acids of 18 to 22 carbon atoms are preferably used as the emulsifiers. The HLB of the emulsifier may preferably be 4 to 15, more preferably 8 to 13. Specific examples of such emulsifiers include sorbitan monolaurate, sorbitan monooleate, tetraglycerol monolaurate and tetraglycerol monooleate. Addition of the emulsifier in an excessively small amount cannot improve dissolution of the water-soluble polysaccharide. Conversely, addition thereof in an excessively large amount significantly impairs the flowability of the granules. The addition amount of the emulsifier to be used is from 0.005 to 1% by weight, preferably from 0.01 to 0.5% by weight based on the final granulated material. These emulsifiers may be used alone or in combination with other emulsifiers.

It is advantageous to prepare the water-soluble polysaccharide obtained in the present invention in an acidic region, namely, at a pH of 2 to 6 in view of the decay of the aqueous solution to be used later. In order to adjust the pH of the water-soluble polysaccharide to 2 to 6, a pH adjusting agent is added either during the production of the water-soluble polysaccharide in advance or to the binder solution during the granulating step. It is suitable to use a mineral acid, an organic acid or a salt of these acids.

Useful examples of the mineral acid include hydrochloric acid, sulfuric acid, nitric acid, phosphoric acid and meta-phosphoric acid. Useful examples of the organic acid include acetic acid, citric acid, oxalic acid, malonic acid, fumaric acid, p-toluenesulfonic acid, tartaric acid, malic acid, lactic acid, levulunic acid, an organic sulfonic acid, ascorbic acid, gluconic acid, hydroxyacetic acid, sulfunilic acid, adipic acid, propionic acid and phytic acid. Further, alkali metal salts, alkaline earth metal salts and ammonium salts of these mineral and organic acids can be appropriately used. One or at least two of these mineral acids, organic acids and salts of these acids may also be used in combination.

Addition of a preservative or antiseptic to the water-soluble polysaccharide obtained in the present invention is advantageous when its decay in the aqueous solution to be used thereafter is taken into consideration. The preserver or antiseptic can be added during production of the water-soluble polysaccharide in advance, or it may be added to the binder solution in the granulating step of the present invention. When the preservative or antiseptic is soluble in water, it can be added directly. When it is dispersible in water, it can be added by the following procedures: a procedure wherein it is dispersed, or it is added to the dispersion of the water-soluble polysaccharide during the production step; and a procedure wherein it is dispersed in the binder solution in the stage of preparing the binder solution during the granulating step of the present invention. Moreover, when a preservative or antiseptic which is volatile or has poor heat resistance is used, it is preferably dispersed after emulsification and enmicrocapsulation.

Suitable examples of the preservative or antiseptic include ethanol, glycine, gulcono-δ-lactone, sorbic acid, p-hydroxybenzoic acid, dehydroacetic acid, hypochlorous acid and its salt, a lower fatty acid ester, polylysine, protamine, lysozyme, mustard-extracted substance, horseradish-extracted substance, chloride of lime and chitosan.

Examples of the granulating method include methods wherein the powder of a water-soluble polysaccharide is sprayed with a binder solution to be coated with the binder solution component such as a fluidized bed granulating method, a fluidized bed multifunctional granulating method, a spray drying granulating method, a rolling granulating method and a stirring granulating method. Of these methods, the fluidized bed granulating method can be preferably utilized.

The binder solution comprises a water-soluble polysaccharide, an emulsifier and a medium which dissolves or disperses the polysaccharide and emulsifier. Although water alone is a preferable medium to be used, a water-soluble solvent such as ethyl alcohol may be added.

In the present invention, there is no specific limitation on the particle size of the water-soluble polysaccharide granules thus obtained so long as the granules have a binder solution coating. However, the average particle size is preferably from 150 to 500 $\mu$m. Even when granules thus produced contain crushed fine ones in a mixture due to friction among the granules, an improved effect of the handling behavior can be obtained. Conversely, when ungranulated fine powder particles remain in the granules, the effect of the improvement is lessened. Preferred granulating conditions in the production process of the present invention are as follows: the binder components comprising a water-soluble polysaccharide and an emulsifier uniformly adhere to the granules of water-soluble polysaccharide powder.

Embodiments of the present invention will be explained below through the following examples, which are only exemplary and are not intended to restrict the spirit of the present invention. In addition, throughout these examples, the parts and percentages are based on weight.

Preparation of Water-Soluble Soybean Hemicellulose

To raw okara obtained in the step of producing separated soybean protein was added water in an amount twice as much as that of non-heated bean-curd refuse, and the pH was adjusted to 4.5 with hydrochloric acid. The mixture was hydrolyzed at 120° C. for 1.5 hours, cooled, and centrifuged (10,000 G×30 minutes). A supernatant and a precipitate thus formed were separated. The precipitate thus separated was further washed with water in an amount equal to that of the precipitate in terms of weight, and centrifuged. The supernatant thus formed and that obtained above were mixed. The mixture was treated with an activated carbon column, and spray dried with a spray drier. The powder thus obtained was screened with a 60 mesh sieve to give water-soluble soybean hemicellulose powder having a particle size of up to 250 $\mu$m.

EXAMPLE 1

A fluidized bed granulator (trade name of Flow Coater FLO-5 Type, manufactured by Freund Industrial Co., Ltd.) was used in the present example. Using a binder solution composed of 10 parts of the water-soluble soybean hemicellulose powder prepared above, 0.5 part of sorbitan monolaurate (trade name of Emasol L-10(F), manufactured by Kao Corporation) and 89.5 parts of water, 200 parts of the same water-soluble soybean hemicellulose powder prepared above was granulated at an intake air temperature of 80° C. and a spray atomizing pressure of the binder solution of 3.0 kg/cm$^2$ to give granules of the water-soluble soybean hemicellulose.

EXAMPLE 2

The procedure of Example 1 was completely repeated except that sorbitan monopalmitate (trade name of Emasol P-10(F), manufactured by Kao Corporation) was used in place of sorbitan monolaurate.

EXAMPLE 3

The procedure of Example 1 was completely repeated except that sorbitan monooleate (trade name of Emasol O-10(F), manufactured by Kao Corporation) was used in the binder solution in place of sorbitan monolaurate.

EXAMPLE 4

The procedure of Example 1 was completely repeated except that 0.05 part of sorbitan monolaurate was used in the binder solution in place of 0.5 part of sorbitan monolaurate.

EXAMPLE 5

The procedure of Example 1 was repeated in the same manner except that tetraglycerol monolaurate (trade name of SY Glystar ML310, manufactured by Sakamoto Yakuhin Kogyo K.K.) was used in the binder solution in place of sorbitan monolaurate.

EXAMPLE 6

The procedure of Example 1 was repeated in the same manner except that tetraglycerol monooleate (trade name of SY Glystar M0310, manufactured by Sakamoto Yakuhin Kogyo K.K.) was used in the binder solution in place of sorbitan monolaurate.

EXAMPLE 7

The procedure of Example 1 was repeated in the same manner except that a spray dried product of gum arabic (trade name of Gum Arabic Spray Dry R-HPS, manufactured by Kenko Tsusho K.K.) was used both in the binder solution and in the powder to become nuclei in place of the water-soluble soybean hemicellulose.

COMPARITIVE EXAMPLE 1

The procedure of Example 1 was repeated in the same manner except that sorbitan monolaurate was not used but the water-soluble soybean hemicellulose alone was used in the binder solution.

COMPARITIVE EXAMPLE 2

The procedure of Example 1 was repeated in the same manner except that the water-soluble soybean hemicellulose was not used but the sorbitan monolaurate alone was used in the binder solution.

Method of Testing Dissolution and Suppression of Foaming

In 2 l of water adjusted to 20° C. was placed at once 100 g of powder or granules of water-soluble polysaccharide while water was being stirred with a magnetic stirrer, and the time required to completely dissolve the polysaccharide was measured. Complete dissolution of the polysaccharide was visually confirmed, and then stirring the solution was stopped. The solution was then allowed to stand still for 1 minute, and the presence or absence of foams was confirmed.

Method of Testing Suppression of Dusting during Handling Operation

In a 1-liter graduated cylinder was placed 100 g of powder or granules of water-soluble polysaccharide. The graduated cylinder was lightly capped, and shaken by repeating the procedure of turning over the graduated cylinder for 10 sec, followed by allowing it to stand still. The presence or absence of fine powder floating in the graduated cylinder, so-called dusting was confirmed.

Comparisons of the results thus obtained are shown below.

|  | Dissolution time (min) | Presence of foams | Presence of dusting |
| --- | --- | --- | --- |
| Example 1 | 1 | No | No |
| Example 2 | 3 | No | No |
| Example 3 | 2 | No | No |
| Example 4 | 5 | No | No |
| Example 5 | 1 | No | No |
| Example 6 | 1 | No | No |
| Example 7 | 2 | No | No |
| Comparative Example 1 | 55 | Yes | No |
| Comparative Example 2 | 30 | No | No |
| Water-soluble soybean hemicellulose powder | 120 | Yes | Yes |
| Spray dried product of gum arabic | 80 | Yes | Yes |

As explained above, in the comparative examples in which either the water-soluble polysaccharide or emulsifier as a binder solution component was absent, the three problems about the handling operation of a polysaccharide as described above could not be solved. On the other hand, in the examples in which water-soluble polysaccharides and emulsifiers were used in the binder solutions used for granulating the water-soluble polysaccharide powders, water-soluble polysaccharides showing good handling behavior were obtained which improved its dissolution in water, which could significantly shorten the time required to be dissolved, and which showed neither foam formation during dissolution nor dusting during its handling operation.

As explained above, use of a water-soluble polysaccharide and an emulsifier in a binder solution employed for granulating water-soluble polysaccharide powder has produced a water-soluble polysaccharide excellent in handling operation which has improved dissolution in water, which significantly shortens the time required to be dissolved, and which shows neither foam formation during dissolution nor dusting during its handling operation. As a result, the use of a water-soluble polysaccharide has resulted in the improvement of the productivity and sanitary control under the situation where a water-soluble polysaccharide is used.

What is claimed is:

1. A process for producing a granulated water soluble polysaccharide, the process comprising:

granulating a first water-soluble polysaccharide in powder in a mixed solution of a second water-soluble polysaccharide and an emulsifier, the mixed solution being used as a binder for the granulated first water-soluble polysaccharide.

2. The process according to claim 1, wherein the water-soluble polysaccharide is water-soluble hemicellulose derived from soybeans.

3. The process according to claim 1, wherein the emulsifier has a pour point of up to 50° C.

4. The process according to claim 1, wherein the emulsifier is a fatty acid ester having a pour point of up to 30° C.

5. The process according to claim 1, wherein the emulsifier has an HLB of 4 to 15.

6. A process for producing a granulated water soluble polysaccharide, the process comprising:

granulating a first water-soluble polysaccharide in powder in a mixed solution of a second water-soluble polysaccharide and an emulsifier selected from the group consisting of sorbitan monolaurate, sorbitan monooleate, tetraglycerol monolaurate, and tetraglycerol monooleate, the mixed solution being used as a binder for the granulated first water-soluble polysaccharide.

7. The process according to claim 6, wherein the emulsifier is sorbitan monolaurate.

8. The production process according to claim 6, wherein the emulsifier is sorbitan monooleate.

9. The process according to claim 6, wherein the emulsifier is tetraglycerol monolaurate.

10. The process according to claim 6, wherein the emulsifier is tetraglycerol monooleate.

* * * * *